(12) United States Patent
Lu et al.

(10) Patent No.: US 12,475,617 B2
(45) Date of Patent: Nov. 18, 2025

(54) MEDIA DATA PROCESSING

(71) Applicant: Lemon Inc., Grand Cayman (KY)

(72) Inventors: Hanlin Lu, Los Angeles, CA (US);
Jianbo Yuan, Los Angeles, CA (US);
Xinyu Li, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 141 days.

(21) Appl. No.: 18/517,908

(22) Filed: Nov. 22, 2023

(65) Prior Publication Data
US 2025/0111559 A1 Apr. 3, 2025

Related U.S. Application Data

(60) Provisional application No. 63/586,099, filed on Sep. 28, 2023.

(51) Int. Cl.
*G06T 11/20* (2006.01)
*G06N 20/00* (2019.01)

(52) U.S. Cl.
CPC ............ *G06T 11/206* (2013.01); *G06N 20/00* (2019.01)

(58) Field of Classification Search
CPC ....... G06T 11/206; G06N 20/00; G06N 3/045
See application file for complete search history.

(56) References Cited

U.S. PATENT DOCUMENTS

| | | | | |
|---|---|---|---|---|
| 8,189,797 | B1* | 5/2012 | Ramirez | H04R 29/008 84/610 |
| 8,890,869 | B2* | 11/2014 | Duwenhorst | G06T 11/001 345/440.1 |
| 9,076,457 | B1* | 7/2015 | Orler | G11B 27/105 |
| 9,241,229 | B2* | 1/2016 | Ramirez | H04R 29/008 |
| 10,404,299 | B1* | 9/2019 | Petre | H04B 1/10 |
| 11,276,419 | B2* | 3/2022 | Zhang | G06N 3/045 |
| 12,051,428 | B1* | 7/2024 | Petrochuk | G10L 25/30 |
| 2014/0281004 | A1* | 9/2014 | Bridges | H04N 21/23418 709/231 |
| 2021/0134312 | A1* | 5/2021 | Koishida | G06V 20/46 |
| 2021/0327400 | A1* | 10/2021 | Rafii | G10K 11/175 |
| 2021/0374570 | A1* | 12/2021 | Cheng | G06N 3/045 |
| 2023/0177384 | A1* | 6/2023 | Nagrani | G06N 3/045 706/12 |

(Continued)

FOREIGN PATENT DOCUMENTS

| | | |
|---|---|---|
| CN | 103729368 A | 4/2014 |
| CN | 111341290 A | 6/2020 |

OTHER PUBLICATIONS

Gong et al., "SSAST: Self-Supervised Audio Spectrogram Transformer," arXiv, Feb. 10, 2022, 11 pages.

*Primary Examiner* — Motilewa Good-Johnson
(74) *Attorney, Agent, or Firm* — Astute IP Law Group (57) ABSTRACT

There are proposed methods, devices, and media for media data processing. In a method, a spectrogram representation is obtained for the media data from a spectrogram of the media data, and a waveform representation is obtained for the media data from a waveform of the media data. A fusion representation is generated for the media data based on the spectrogram representation and the waveform representation. A classification of the media data is determined based on the fusion representation. With the proposed solutions, the media data may be processed in a more accurate way.

18 Claims, 4 Drawing Sheets

(56) References Cited

U.S. PATENT DOCUMENTS

| | | | | |
|---|---|---|---|---|
| 2023/0177407 A1* | 6/2023 | Gupta | ............... | G06N 3/08 |
| | | | | 706/12 |
| 2024/0374219 A1* | 11/2024 | Mohammadi | ........ | A61B 5/0823 |
| 2025/0036940 A1* | 1/2025 | Moin | ............ | G06N 3/047 |
| 2025/0077873 A1* | 3/2025 | Zhu | ............ | G06N 3/08 |
| 2025/0111559 A1* | 4/2025 | Lu | ............ | G06T 11/206 |
| 2025/0131208 A1* | 4/2025 | Luong | ............ | G06N 3/045 |
| 2025/0140265 A1* | 5/2025 | Yu | ............ | G10L 19/0017 |
| 2025/0149022 A1* | 5/2025 | Borsos | ............ | G10L 13/08 |
| 2025/0259068 A1* | 8/2025 | Zisserman | ............ | G06N 3/045 |

\* cited by examiner

MEDIA DATA PROCESSING

CROSS REFERENCE TO RELATED APPLICATIONS

The present application claims priority to U.S. Provisional Patent Application No. 63/586,099, entitled "MEDIA DATA PROCESSING", filed on Sep. 28, 2023, the contents of which are hereby incorporated by reference in its entirety.

FIELD

Example implementations of the present disclosure generally relate to the computer science technologies, and in particular to media data processing.

BACKGROUND

Machine Learning approaches, including attention-based transformers, are playing an important role in multi-media modeling. The focus of current media data (such as audio data and/or video data) modeling methods relies on spectral analytical features, these approaches require feature engineering and potentially lead to information loss. There are various acoustical techniques and powerful machine learning models, audio classification research keeps making rapid progress over the last decades.

SUMMARY

In a first aspect of the present disclosure, there is provided a method for processing media data. The method comprises: obtaining a spectrogram representation for the media data from a spectrogram of the media data, and obtaining a waveform representation for the media data from a waveform of the media data; generating a fusion representation for the media data based on the spectrogram representation and the waveform representation; and determining a classification of the media data based on the fusion representation.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

The Summary is provided to introduce a selection of concepts in a simplified form that are further described below in the Detailed Description. The Summary is neither intended to identify key features or essential features of the subject matter described herein, nor is it intended to be used to limit the scope of the subject matter described herein.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

Principle of the present disclosure will now be described with reference to some implementations. It is to be understood that these implementations are described only for purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for purpose of describing particular implementations only and is not intended to be limiting example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "model" is referred to as an association between an input and an output learned from training data, and thus a corresponding output may be generated for a given input after the training. The generation of the model may be based on a machine learning technique. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. Generally, the validation stage may be considered as a step in a training process, or sometimes may be omitted. At the application stage, the resulting machine learning model may be used to process a real-world model input based on the set of parameter values obtained from the training process and to determine the corresponding model output.

Machine Learning approaches, including attention-based transformers, are playing an important role in multi-media modeling. While the focus of current audio modeling methods relies on spectral analytical features, these approaches require feature engineering and potentially lead to information loss. As a comparison, raw audio waves are proved to convey the complement information as opposed to audio analytical features. How to better extract audio representations from both analytical and raw audio signals remains a valuable question. Towards this goal, there is proposed a solution for processing media data: Cross-Representation modeling on Audio waveForms and specTrograms (CRAFT). Specifically, an innovative representation modeling is designed to extract joint features from diverse representations in the audio modality, and choose acoustic classification to showcase the effectiveness of the proposed approach.

In the present disclosure, by aligning these individual representations effectively, the spectrogram and waveform representations may complement each other and substantially enhance the quality of downstream tasks. To mitigate semantic misalignment, a cross-representation contrastive learning framework is proposed for incorporating spectrogram and waveform based contrastive learning loss in audio pretraining. The 2-stage training conventions while sufficient labels are lacking, CRAFT is pretrained on large amount of unlabeled data by leveraging self-supervised contrastive learning method on both spectrogram and raw waveform data, and is later finetuned on labeled data with fusion bottlenecks.

Subsequently, to alleviate temporal misalignment, a cross representation transformer architecture is proposed, which models on spectrogram and waveform tokens together with fusion bottlenecks. The proposed CRAFT is tested on two commonly used datasets, demonstrating superior performances. Based on the above, the proposed solution may outperform the spectrogram-based counterpart by an impressive 4.4% higher mAP on AudioSet balanced set, and achieves SOTA comparable performances on full set, which suggests the alleviation of semantic misalignment and temporal misalignment boosts cross-representation performances.

The following paragraphs will provide a general instruction of the media data processing. Equipped with various acoustical techniques and powerful machine learning models, audio classification research keeps making rapid progress over the last decades. Specifically, various machine learning approaches, including Restricted Boltzmann Machine (RBM), Recurrent Neural Network (RNN), and Convolutional Neural Networks (CNNs), have been widely applied to audio tasks. Motivated by the success of the recent attention-based models in vision domain, language domain, video domain, there are potential advantages of applying transformer models to improve the performances in audio classification tasks. The successful knowledge transfer of purely transformer based methods on audio classification task was first shown in AST. More recently, in order to better extract global context in multiple granularities, researchers leverage hierarchical self-attention based methods in audio tasks.

The majority of the current attention-based audio transformers take spectrogram-based features as inputs, such as log-mel features and MFCC features. However, spectral features calculation is time consuming and requires extra computation complexity. Moreover, energy map based approaches potentially lead to information loss. As a comparison, raw audio waves are proved to convey the complement information as opposed to audio analytical features. However, how to effectively extract and fuse representations from both spectrogram and raw waveforms in attention-based approaches still remains under-explored. In this disclosure, the spectrogram and waveform fusion are comprehensively explored by leveraging both single-modality (both spectrogram and waveform tokens) and cross-modality (fused bottlenecks) techniques, and obtained superior performances are compared with spectrogram-only approaches. CRAFT has the potential to be applied to other modality as well, and the contributions are three-fold:

Fusing information from diverse domain representations, such as waveform and spectrogram representations in the context of audio, poses non-trivial challenges. These challenges primarily revolve around two critical aspects: (i) Semantic Misalignment: The features acquired from spectrograms predominantly emphasize time-frequency responses, whereas waveform-based features concentrate more on capturing common patterns. For instance, auditory examples, e.g. explosive car engine sound can be easily captured by spectrograms while successive breezes might be a good fit for waveforms. Consequently, employing a straightforward approach of naively fusing or concatenating features from distinct modalities fails to appreciably enhance the comprehensiveness of the feature set, thereby hindering improvements in classification performances. (ii) Temporal Misalignment: Spectrograms are generated using Short-Time Fourier Transform (STFT), which imposes fixed frequency and temporal resolutions. In contrast, waveform representations involve direct learning from raw samples and aggregation at multiple scales. Thus, instead of simply concatenating features from different representations over time, a solution is proposed to enhance the representation alignment, accounting for these dissimilar temporal characteristics.

To tackle the aforementioned challenges, CRAFT is proposed, a tailored two-step system meticulously designed to improve both semantic and temporal alignment among representations originating from distinct calculations within the audio modality. For the semantic alignment, it is proposed an innovative cross-representation contrastive learning approach (named PSWaCL) during the pretraining phase, in addition to the conventional single representation learning tasks. This solution plays a pivotal role in enhancing the alignment of feature semantics derived from waveform and spectrogram representations. To achieve cross-representation temporal alignment, bottleneck tokens are introduced to facilitate the fusion of features across domains (named SWaB) in downstream tasks. Further, cross-representation strategies is conducted with tailored design, culminating in the presentation of strong performances for the application of contrastive loss in pretraining stage and bottleneck fusion in finetuning stage.

Experiments on two frequently utilized datasets show better performance than state-of-the-art (SOTA) or SOTA comparable performances. It is noteworthy that the innovative PSWaCL objective in pretraining and SWaB fusion in finetuning allow to leverage waveform representations, leading to a remarkable 4.4% mAP increase in AudioSet balanced set classification, compared with the spectrogram-only counterpart. Furthermore, the proposed solution exhibits robust generalization capabilities, delivering performance levels comparable to the state-of-the-art on downstream tasks, as evidenced by results on the ESC-50 dataset.

Generally, the Cross-Representation modeling on Audio waveForms and specTrograms (CRAFT) provides an innovative cross-spectrogram-waveform modeling method designed to extract comprehensive features from diverse representations in the audio domain. CRAFT is equipped with (i) MSAE, a multi-scale embedding on waveform inputs, (ii) PSWaCL, which contrasts spectrogram and waveform representations in pretraining, and (iii) SWaB, which fuses both audio representations with fusion bottlenecks in finetuning. CRAFT is the first transformer framework that systematically explores the cross-representation modeling on spectrograms and waveforms within audio domain.

Experiments empirically verify the performance of CRAFT, and ablate the performance impact of each factor. With additional audio modeling on waveforms, CRAFT successfully achieves superior performances compared to spectrogram-only counterpart, and further proves that spectrograms and waveforms convey complement information.

In the context of the present disclosure, CRAFT is built upon SSAST, which operates on audio spectrograms, employs a masked spectrogram patch modeling (MSPM) framework and improves pretraining for various audio and speech tasks. A simple extension of SSAST is provided with incorporation of waveforms. In the high level, CRAFT is equipped with three unique designs: (i) the Multi-Scale Audio Embedding (MSAE), which fills the gap of lacking raw audio waveform embedding in the era of transformer, (ii) the Contrastive Learning between Spectrogram and-Waveform representations (SWaCL), which leverages contrastive learning on the natural pairing of audio spectrograms and audio waveforms embedded by MSAE, an (iii) the Spectrogram and Waveform representations with fusion Bottlenecks (SWaB), which treats spectrograms and waveforms as different "modalities" and utilizes bottleneck tokens to exchange information between both representations in finetuning.

Figure 1A:
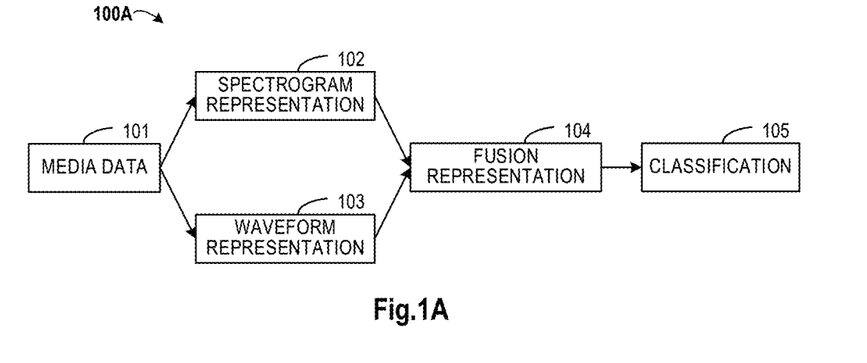
FIG. 1A illustrates a block diagram of an example procedure in accordance with some example implementations of the present disclosure.

In implementations of the present disclosure, there is proposed a method for processing media data. Referring to FIG. 1A for a brief description of the present disclosure, FIG. 1A illustrates a block diagram 100A of an example procedure in accordance with some example implementations of the present disclosure. As illustrated in FIG. 1A, a media data 101 may comprise any type of media data, such as an audio clip, a video clip and the like. For the purpose of description, an audio clip may be taken as an example of the media data 101. Here, both of the spectrogram and the waveform of the media data 101 are considered in generating the fusion representation for the media data 101.

Specifically, a spectrogram representation 102 is obtained for the media data 101 from a spectrogram of the media data 101, and a waveform representation 103 is obtained for the media data 101 from a waveform of the media data 101. Further, a fusion representation 104 is generated for the media data 101 based on the spectrogram representation 102 and the waveform representation 103. Here, the fusion representation 104 may be used for processing downstream tasks. Especially, a classification 105 of the media data 101 may be determined based on the fusion representation 104. Here, the classification 105 may indicate a content classification of the media data 101, for example, sounds from a cat, or sounds from a dog, and the like. With these implementation, multiple modalities in the media data may be considered in determining the classification of the media data, and thus the classification may be determined in a more accurate way. Here, the media data may comprise any of an audio clip, or a video clip.

In implementations of the present disclosure, the method may be implemented by a learning model. The learning model may be implemented based on machine learning networks and comprise different network for different functions. For example, the learning model may comprise: a spectrogram network for extracting the spectrogram representation, a waveform network for extracting the waveform representation, a fusion a network for determining the fusion representation, and a classification network for implementing the downstream classification task.

Figure 1B:
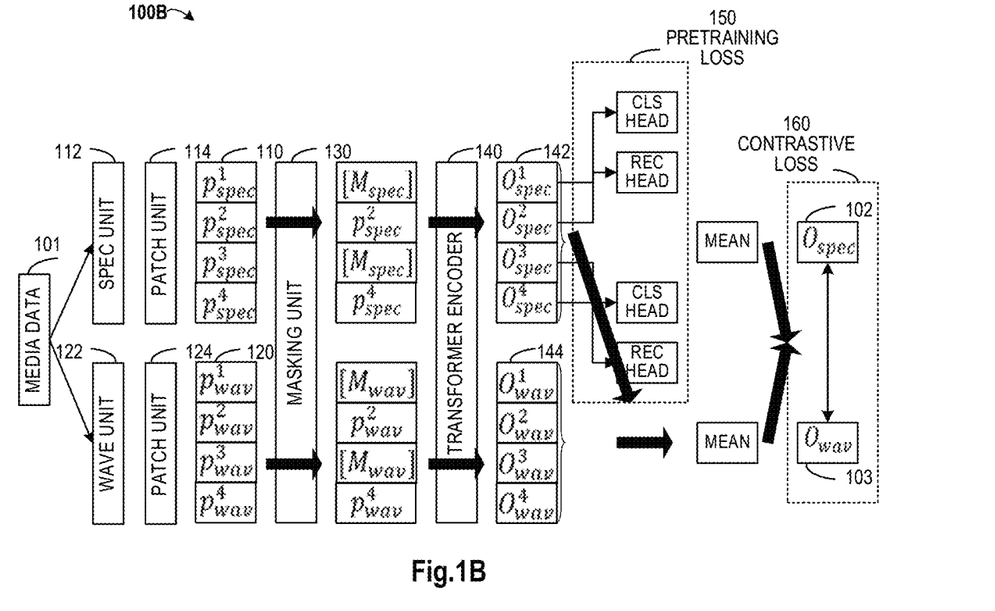
FIG. 1B illustrates a block diagram of an example architecture in accordance with some example implementations of the present disclosure.

FIG. 1B illustrates a block diagram 100B of an example architecture in accordance with some example implementations of the present disclosure. As illustrated in FIG. 1B, the block diagram 100B may be used for implementing the spectrogram network and the waveform network, where the spectrogram network relates to the upper portion of FIG. 1B and the waveform network relates to the lower portion of FIG. 1B. Specifically, a spectrogram unit 112 and a patch unit 114 may be deployed at the start of the spectrogram network. Here, the spectrogram unit 112 may generate a spectrogram map from the spectrogram of the media data 101 (such as an audio clip), and the patch unit 114 may obtain a plurality of spectrogram patches 110 from the spectrogram map.

It is to be understood that only four (2*2) spectrogram patches (indicated as $p_{spec}^1$, $p_{spec}^2$, $p_{spec}^3$, $p_{spec}^4$) are illustrated as examples, alternatively and/or in addition, there may be more spectrogram patches (for example, 3*3 or another number). The patches 110 may be subjected to a mask operation at the masking unit 130 for obtaining corresponding masks (indicated as [$M_{spec}$]). Then, the masks and the patches may be inputted into a transformer encoder 140 for extracting corresponding embeddings 142 (indicated as $O_{spec}^1, O_{spec}^2, O_{spec}^3, O_{spec}^4$) for the spectrogram patches 110. Further, the embeddings 142 may be inputted into subsequent networks and then the spectrogram representation 102 may be obtained.

With these implementations, the spectrogram representation 102 may be determined based on the plurality of spectrogram patches from the media data 101. Therefore, more information may be extracted from the spectrogram and then the spectrogram representation may carry more reliable information and reflect comprehensive characteristics of the spectrogram in a more accurate way.

In implementations of the present disclosure, the waveform network may be implemented in a similar way. For example, in order to obtain the waveform representation, a waveform map is generated from the waveform of the media data 101 by a waveform unit 122. A plurality of waveform patches are generated from the waveform map by a patch unit 124, here the plurality of waveform patches are aligned to the plurality of the spectrogram patches. The waveform representation is determined based on the plurality of waveform patches. With these implementations, the aligned patches may provide convenience for the later fusion procedure.

Referring to FIG. 1B, a waveform unit 122 and a patch unit 124 may be deployed at the start of the waveform network. Here, the waveform unit 122 may generate a waveform map from the waveform of the media data 101. Specifically, frequency-related features from raw waveform of the media data, where the proposed multi-scale feature extraction is called as Multi-Scale Audio Embedding (MSAE). The waveform unit 122 may generate the waveform map at multiple scales based on the following:

$$x^s = \theta^s(x), s \in [11, 51, 101] \quad \text{Equation 1a}$$
$$x_{MSAE} = Concat([Poll(x^s)]_s) \quad \text{Equation 1b}$$
$$p_{wav} = Patchfy(x_{MSAE}) \quad \text{Equation 1c}$$

Figure 2:
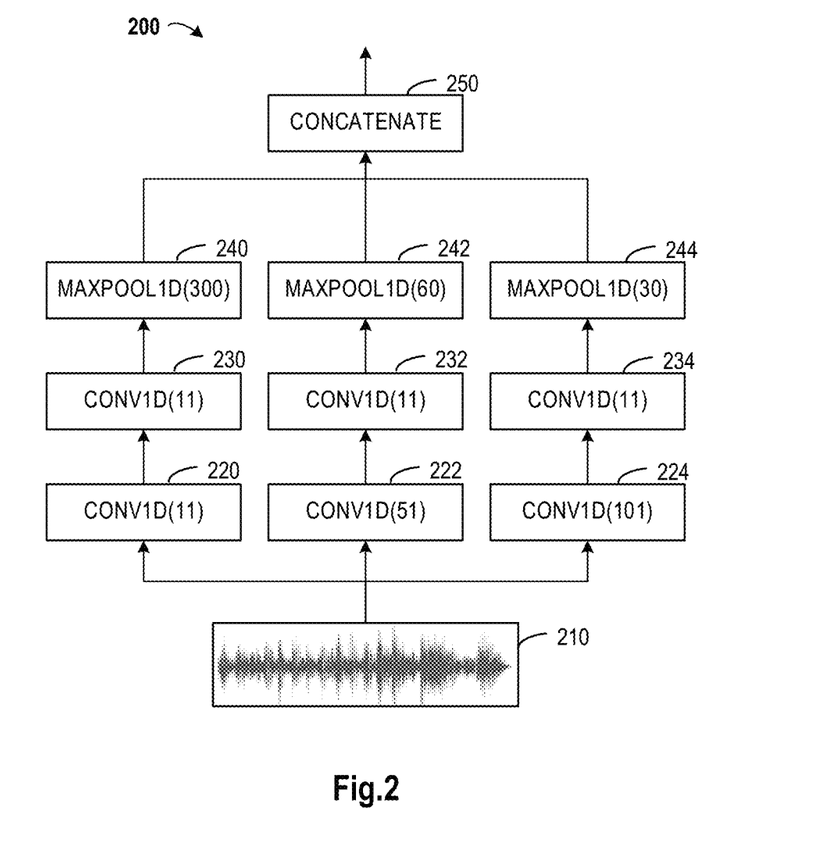
FIG. 2 illustrates an example architecture of multi-scale audio embedding in accordance with some example implementations of the present disclosure.

In the above equations, x indicates the media data, $\theta^s$ indicates the convolution operation with a kernel size of s for the feature extraction, and $x^s$ indicates the extracted features at corresponding scales. Here, 1D convolutions with smaller kernel sizes may capture fine-grained temporal-frequency responses, while convolutions with larger kernels may extract long-term temporal-frequency characteristics. Referring to FIG. 2 for more details about generating the waveform map, FIG. 2 illustrates an example architecture 200 of multi-scale audio embedding in accordance with some example implementations of the present disclosure. As illustrated in FIG. 2, the waveform 210 of the media data may be inputted into different convolution unit 220, 222 and 224 with different kernel sizes of 11, 51, and 101. Further, there may be another layer including convolution unit 230, 232, and 234. Then, average pooling units 240, 242, 244 are used for the pooling operation and then the results from respective pooling units are concatenated by the concatenating unit 250 to synchronize the features across different scales.

Returning to FIG. 1B, the waveform unit 122 may output the waveform map and then the patch unit 124 may obtain a plurality of waveform patches from the waveform map. Here, patch unit 124 is similar as the patch unit 114, and the patch unit 124 may output four (2*2) waveform patches 120 (indicated as $p_{wav}^1, p_{wav}^2, p_{wav}^3, p_{wav}^4$). It is to be understood that the number of the waveform patches equals to the number of the spectrogram patches, and then each waveform patch is aligned to a corresponding spectrogram patch. Further, the patches 120 may be subjected to the same mask operation at the masking unit 130 for obtaining corresponding masks (indicated as [$M_{wav}$]). Then, the masks and the patches may be inputted into a transformer encoder 140 for extracting corresponding embeddings 144 (indicated as $O_{wav}^1, O_{wav}^2, O_{wav}^3, O_{wav}^4$) for the waveform patches 120. Further, the embeddings 144 may be inputted into subsequent networks and then the wave representation 103 may be obtained. With these implementations, more information may be extracted from the waveform and then the waveform representation may carry more reliable information and reflect comprehensive characteristics of the waveform in a more accurate way.

In implementations of the present disclosure, the learning model may be trained in a two-stages procedure. In a pretraining stage, the learning model may be pretrained based on unlabeled media data according to self-supervised contrastive learning; and in a finetuning stage, the pretrained learning model may be adjusted based on labeled media data. With these implementations, a large number of unlabeled data samples may be used for the pretraining stage and make the learning model to obtain basic knowledges about the extracting the spectrogram representation and the waveform representation. Then, during the finetuning stage, a small number of labeled data samples may be used for obtaining the association between the fusion representation and the downstream task. Therefore, the accurate level of the learning model may be increased and the downstream task may be implemented in a more effective way.

The following paragraphs will describe the pretraining stage first, and the pretraining loss 150 may relates to any of the reconstruction loss and classification loss. In implementations of the present disclosure, reconstruction loss may be considered in the pretraining stage. Specifically, with respect to a first media data (i.e., a training sample) reconstructed media data may be obtained from the learning model based on any of the first spectrogram representation and the first waveform representation. Further, the learning model may be updated based on a reconstruction loss that decreases a difference between the first media data and the reconstructed media data. Still referring to FIG. 1, the pretrain loss 150 may be determined for updating the learning model. A naive extension of SSAST may be implemented to treat audio waves as additional inputs, completely separated from the computation of spectrograms. In pretraining, this simple extension of joint of the spectrogram and waveform modeling in the pretrain stage may be called as SWaPT in the present disclosure, further the simple extension of waveform in finetuning may be called as SWAST, i.e., Spectrogram andWaveform based AST modeling.

In summary, SWaPT-SWAST is used to indicate the simple extension of SSAST with waveforms added in both pretraining and finetuning. In the pretraining stage, the SSAST framework applies a masked spectrogram patch modeling (MSPM) objective on audio spectrograms, which consists of both discriminative (indicated as $\mathcal{L}_{spec}^d$ for the classification loss) and generative ((indicated as $\mathcal{L}_{spec}^g$ for the reconstruction loss) training objectives. A weight $r_g$ may be used to indicate the ratio of generative loss, and then the MSPM loss is indicated as:

$$\mathcal{L}_{MSPM} = \mathcal{L}_{spec}^d + r_g \cdot \mathcal{L}_{spec}^g \qquad \text{Equation 2}$$

In the above equation, $\mathcal{L}_{MSPM}$ indicates the loss related to the masked spectrogram patch modeling, $\mathcal{L}_{spec}^d$ indicates the classification loss related to the spectrogram, $\mathcal{L}_{spec}^g$ indicates the reconstruction loss related to the spectrogram, and $r_g$ indicates the weight. With these implementations, the learning model may be trained towards a direction that either of the spectrogram representation and the waveform representation may describe the media data in an accurate way.

In SWaPT, the spectrogram calculations are the same as SSAST and completely isolated from waveforms except the final linear classification layer. For waveform representations, the MSAE-processed tokens are input into the same model backbone, followed by both discriminative and generative training objectives. The training objective on waveforms is the same equation as spectrogram calculations in SSAST except that the spectrogram tokens $x_{spec}$ are replaced with waveform tokens $x_{spec}$. The total training loss of SWaPT, indicated as $\mathcal{L}_{SWaPT}$, is designed to be the sum of spectrogram and waveform losses with a hyper-parameter $r_w$ to control the ratio of loss from waveform representations in the following way:

$$\mathcal{L}_{SWaPT} = \left(\mathcal{L}_{spec}^d + r_g \cdot \mathcal{L}_{spec}^g\right) + r_w \cdot \left(\mathcal{L}_{wav}^d + r_g \cdot \mathcal{L}_{wav}^g\right) \qquad \text{Equation 3}$$

In the above equation, $\mathcal{L}_{SWaPT}$ indicates the SWaPT loss, $\mathcal{L}_{wav}^d$ indicates the classification loss related to the waveform, $\mathcal{L}_{wav}^g$ indicates the reconstruction loss related to the waveform, and $r_g$ indicates the weight. Meanwhile, other symbols have the same meanings as those in the previous equations.

In SWAST, both spectrograms and waveforms are input to the backbone of the learning model, and a final linear layer is added to classify the concatenation of the spectrogram outputs and waveform outputs, and SWaPT-SWAST is a natural extension of SSAST with additional waveform tokens. Here, the goal of this simple extension is that the shared model backbone will be capable of extracting separate semantics from both spectrograms and waveforms, simultaneously. As the spectrogram and waveform representations are largely diversified and misaligned, which makes it unreasonable to expect that one shared model backbone achieves strong performances on both spectrograms and waveforms.

In implementations of the present disclosure, the contrastive learning may be implemented in the pretraining stage. Specifically, the contrastive learning may be called as Spectrogram and Waveform based Contrastive Learning (SWaCL). In order to tackle the semantic misalignment during pretraining, contrastive learning is adopted to contrast outputs from spectrograms and waveforms after projection onto same high-dimensional space. Still referring to FIG. 1B, the spectrogram embedding 142 and the waveform embedding 144 naturally constitute the two branches of the contrastive learning. Here, the term "Encoder" may indicate the common backbone for the contrastive learning, and post-backbone outputs may be donated as $O_{spec}$=Encoder($p_{spec}$) and $O_{wav}$=Encoder($p_{wav}$). Further, the InfoNCE contrastive loss (indicated as $\mathcal{L}_{SWaCL}$) in SWaCL is defined in Equation 4a.

$$\mathcal{L}_{SWaCL} = -\frac{1}{N}\sum_{i=1}^{N}\log\left(\frac{\exp\left((O_{wav}^i)^T O_{spec}^i\right)}{\sum_{j=1}^{N}\exp\left((O_{wav}^j)^T O_{spec}^j\right)}\right) \qquad \text{Equation 4a}$$

In the above equation $\mathcal{L}_{SWaCL}$ indicates the InfoNCE contrastive loss based on the spectrogram representation and the waveform representation, $O_{spec}^i$ and $O_{wav}^i$ indicate the spectrogram and waveform embeddings, respectively, N indicates the number of the patches, and T indicates the temperature parameter in the contrastive learning.

In implementations of the present disclosure, positive sample pairs and negative sample pairs may be selected for the contrastive learning. Specifically, the spectrogram representation and waveform representation for the same media data may be used for generating the positive sample pair, and the spectrogram representation and waveform representation for different media data may be used for generating the negative sample pair. Specifically, a first spectrogram representation and a first waveform representation may be obtained from first media data, and then the learning model may be updated according to a contrastive loss that decreases a difference between the first spectrogram representation and the first waveform representation. With these implementations, the spectrogram representation and waveform representation for the same media data may be pulled closer so as to describe the potential association between the spectrogram and waveform aspects of the media data.

In implementations of the present disclosure, second media data that is different from the first media data may work as the training sample, where a second spectrogram representation and a second waveform representation may be obtained from the second media data. The learning model may be updated according to a contrastive loss that increases a difference between the first spectrogram representation and the second waveform representation. With these implementations, the spectrogram representation and waveform representation for different media data may be pushed farther so as to describe the potential association between the spectrogram and waveform aspects of the media data.

Further, the total loss in CRAFT pretraining stage is the joint MSPM loss and SWaCL loss, called PSWaCL loss, and is provided as Equations 4b and 4c.

$$\mathcal{L}_{PSWaCL} = \mathcal{L}_{MSPM} + r_{cl} \cdot \mathcal{L}_{SWaCL} \qquad \text{Equation 4b}$$

$$= \left(\mathcal{L}_{spec}^d + r_g \cdot \mathcal{L}_{spec}^g\right) + r_{cl} \cdot \mathcal{L}_{SWaCL} \qquad \text{Equation 4c}$$

In the above equation, a weight $r_{cl}$ indicate the ratio of contrastive learning loss, and other symbols have the same meanings as those in the previous equations. With the above equations, the learning model may be trained preliminarily. Then the finetuning stage may further increase the accurate level of the learning model.

In implementations of the present disclosure, in order to generate the fusion representation, an intermedia representation may be determined based on a bottleneck representation, the spectrogram representation and the waveform representation according to an attention operation. Here, a dimension of the intermedia representation is equal to a sum of dimensions of the bottleneck representation, the spectrogram representation and the waveform representation. The fusion representation is extracted from the intermedia representation by removing a portion of the intermedia representation corresponding to the bottleneck representation. It is to be understood that the bottleneck representation is used for interactions between spectrogram representation and the waveform representation via the attention operation. After the attention operation, the two representations may penetrate into each other and thus the portion corresponding to the bottleneck representation may be removed. With these implementations, information about the spectrogram and waveform aspects may be fused according to the attention operation and thus the intermedia representation may carry fused information about the spectrogram and waveform of the media data. Therefore, the fusion representation may be determined in a more accurate way.

Figure 3A:
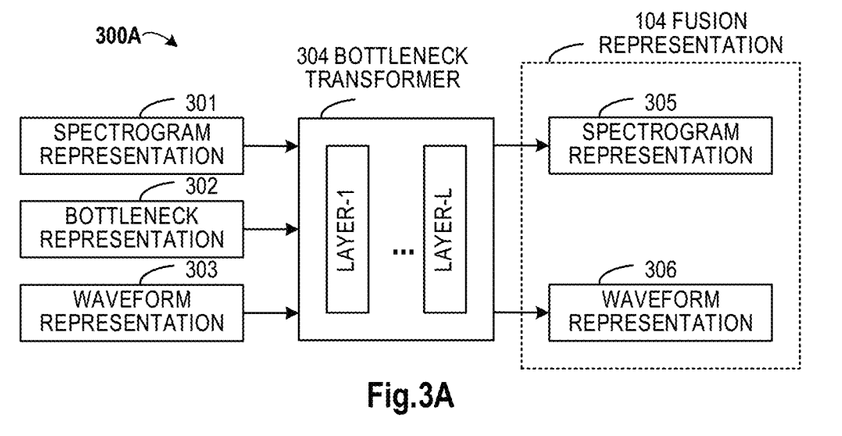
FIG. 3A illustrates a block diagram of a brief fusion procedure in accordance with some example implementations of the present disclosure.

Referring to FIG. 3A for a general description of the fusion procedure. FIG. 3A illustrates a block diagram 300A of a brief fusion procedure in accordance with some example implementations of the present disclosure. As illustrated in FIG. 3A, a bottleneck transformer 304 may be used for the fusion network, where spectrogram embedding 301 and waveform embedding 303 may be inputted into the bottleneck transformer 304. Further, in order to fuse spectrogram embedding 301 and waveform embedding 303 properly, the bottleneck representation 302 is also inputted into the bottleneck transformer 304. The bottleneck transformer 304 may have a plurality of encoder layers (for example, layer-1, . . . , layer-L). The plurality of encoder layers may work in an iterative way and then the spectrogram embedding 305 and waveform embedding 306 may be combined as the fusion representation 104.

To maximize the collective modeling on spectrograms and waveforms during finetuning, the temporal misalignment is processed by incorporating fusion bottlenecks, here the backbone of the bottleneck transformer 304 may treat spectrogram and waveform as distinct modalities. These enhancements serve to increase the model's performance in downstream tasks. In the present disclosure, Spectrogram and Waveform modeling with fusion Bottlenecks may be called as SWaB. In SWaB, a common model backbone is implemented for both spectrogram and waveform representations and introduce additional bottleneck tokens. Treating spectrograms and waveforms as distinct modalities and applying bottlenecks to mitigate temporal misalignment empirically enhance the performances.

Figure 3B:
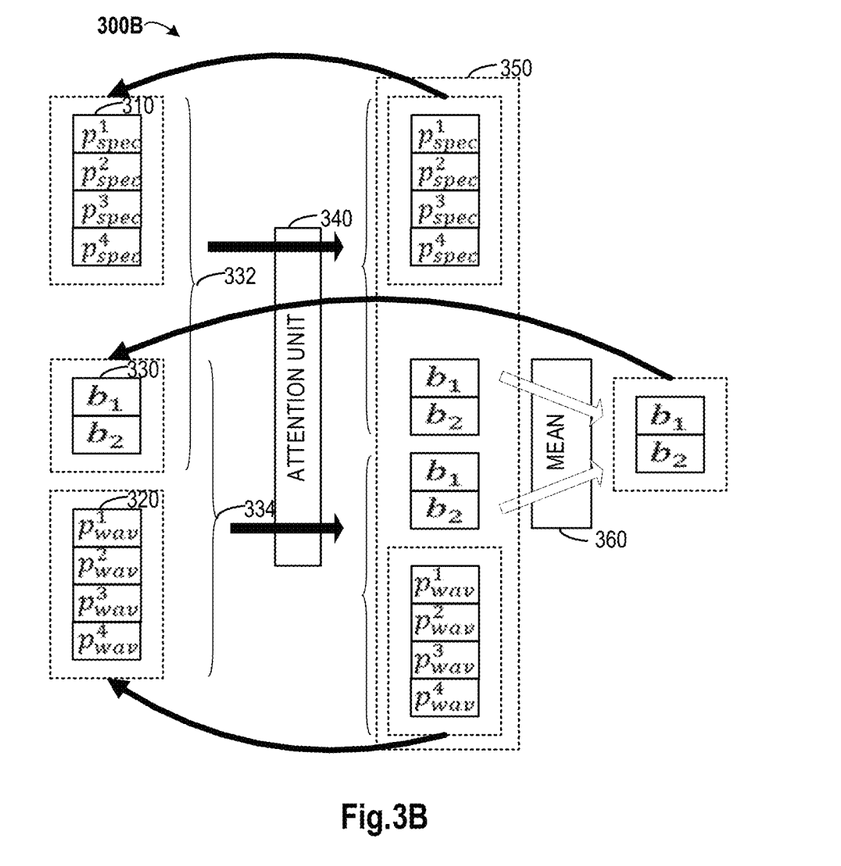
FIG. 3B illustrates a block diagram of an example procedure implemented at each layer during the fusion procedure in accordance with some example implementations of the present disclosure.

Referring to FIG. 3B for more details, FIG. 3B illustrates a block diagram 300B of an example procedure implemented at each layer during the fusion procedure in accordance with some example implementations of the present disclosure. As illustrated in FIG. 3B, a small set of fusion bottleneck tokens 330 (indicated as $b_1, \ldots, b_B$, where B indicates the number of bottleneck tokens) into the input spectrogram tokens $t_{spec}$ and waveform tokens $t_{wav}$. Here, the number of the bottleneck tokens may have a predetermined number, for example, 2, 4, 8 and the like. At the first encoder layer, the bottleneck tokens 330 may have random values (for example, depending on the normal distribution and the like).

In implementations of the present disclosure, in order to determine the intermedia representation, an intermedia spectrogram representation may be determined based on a concatenation of the spectrogram representation and the bottleneck representation according to the attention operation. Similarly, an intermedia waveform representation may be determined based on a concatenation of the waveform representation and the bottleneck representation according to the attention operation. Further, the intermedia representation may be generated based on an attention of the intermedia spectrogram representation and the intermedia waveform representation. With these implementations, the fusion procedure between the spectrogram and the waveform representations may be implemented by the attention operation and thus the intermedia representation may be determined in an easy and effective way.

As illustrated in FIG. 3B, the spectrogram representation 310 and the bottleneck representation 330 may be concatenated to form the intermedia spectrogram representation 332, the waveform representation 320 and the bottleneck representation 330 may be concatenated to form the intermedia waveform representation 334. Then the intermedia representation 350 may be generated based on an attention (for example, by the attention unit 340) of the intermedia spectrogram representation 332 and the intermedia waveform representation 334.

In implementations of the present disclosure, a transformer encoder layer may be indicated as $Encoder_l$, and tokens are passed through $Encoder_l$ twice. During each pass, the representation tokens may be concatenated with bottleneck tokens and then proceed with attention and other computation operations. Mathematically, the forward passes are represented as follows:

$$[o_{spec}, b_1^s, \ldots, b_B^s] = Encoder_l(Concat(t_{spec}, b_1, \ldots, b_B)) \quad \text{Equation 5a}$$

$$[o_{wav}, b_1^w, \ldots, b_B^w] = Encoder_l(Concat(t_{wav}, b_1, \ldots, b_B)) \quad \text{Equation 5b}$$

$$b_1, \ldots, b_B = mean(b_1^s, b_1^w), \ldots, mean(b_B^s, b_B^w) \quad \text{Equation 5c}$$

As illustrated in FIG. 3B, at the first encoder layer, $b_1, \ldots, b_B$ may have random values and then $[o_{spec}, b_1^s, \ldots, b_B^s]$ and $[o_{wav}, b_1^W, \ldots, b_B^W]$ may be obtained according to the above Equations 5a and 5b. Further, based on the above Equation 5c, a mean unit 360 may calculate the mean values and the mean values may work as the new bottleneck tokens $b_1, \ldots, b_B$ for the next layer. The above procedure may continue until the final encoder layer is reached. With these implementations, the fusion representation 104 may be determined in an iterative way and thus the accurate level for the fusion representation 104 may be increased.

In implementations of the present disclosure, finetuning may be implemented with the labelled data sample. Specifically, an estimated classification may be obtained from the pretrained learning model based on a third fusion representation of third media data, the third media data being labeled media data; and the pretrained learning model may be updated based on a classification loss that decreases a difference between a classification of third media data and the estimated classification. Specifically, the third media data may be inputted into the learning model, and a corresponding fusion representation may be obtained according to the above method, and then an estimated classification may be outputted from the learning model. Further, a classification loss may be determined for finetuning the learning model. With these implementations, the pretrained learning model already has basic knowledges and thus the finetuning stage increases the accurate level of the learning model without a great number of labelled media data.

With the proposed solution, in pursuit of the objective to improve the performance of the audio model with limited data, a novel approach is introduced: the fusion of representations derived from both audio spectrograms and audio raw waveforms. This strategy is rooted in the understanding that spectrograms and waveforms partially carry complementary information. The present disclosure intentionally employs the same backbone architecture for both streams in finetuning, thereby continue to facilitate the fusion of information. Following a parallel fusion strategy, during the finetuning stage, the present disclosure continues to integrate spectrogram and waveform representations and feed them through the identical pretrained backbone introduced in CRAFT. Furthermore, in the context of finetuning, the backbone is thoughtfully designed to treat spectrogram and waveform as distinct modalities, incorporating fusion bottlenecks. These enhancements serve to increase the model's performance in downstream tasks.

With respect to SWAB as outlined in the previous design, the CRAFT-pretrained checkpoint is exposed to both spectrograms and waveforms during the pretraining stage. Consequently, it acquires proficient modeling abilities for both patch streams. In order to fully harness the potential of CRAFT for both streams in downstream tasks, SWaB is introduced. In SWaB, the present disclosure maintains the practice of employing a common model backbone for both spectrogram and waveform streams, while also introducing additional bottleneck tokens specific to each stream. While the original fusion bottleneck tokens were designed to fuse cross-modality representations, in downstream tasks, treating spectrogram and waveform streams as distinct modalities can further enhance the performance.

The following paragraph will describe the experiments. AudioSet includes more than 2 million 10-second audio clips with 527 labels. The AudioSet training set has been split into two sections: full set and balanced set comprising 2M and 22 k samples, respectively. In implementations of the present disclosure, mean average-precision (mAP) for various solutions are compared. Another dataset ESC50 includes environmental sound recordings categorized into 50 classes, with each class having 40 samples. To maintain consistency with existing solutions, a 5-fold cross-validation is adopted and the average accuracy are used as the performance metric.

With respect to implementation details during pretraining, to maintain consistency with prior research, the training methodology outlined in SSAST is adopted. Specifically, the input audio clip from AudioSet is truncated to 10 seconds. For spectrogram calculations, each wave signal is converted into a 128-dimension log Mel filter bank calculated with a 25 ms window size for every 10 ms, and then split into patches of size 16*16, followed by patch-embedded into a 768-dimensional vector. For waveform calculations, the 10-sec audio clip is input into MSAE with kernel sizes of 11, 51 and 101. During the pretraining process, a batch size is 180 and the Adam optimizer is used with an initial learning rate set to 5e-4. With contrastive loss introduced in SWaCL, the CL loss ratio is set as 1e-2 to balance the patch masking loss and contrastive loss. For downstream tasks, following the same training setting: the learning rate of 5e-5 and 1e-4, total epochs of 25 and 50, for AudioSet and ESC50, respectively. The mixup and SpecAugment is used for data augmentation.

With respect to the main results, the proposed CRAFT is compared with previous works, and the comparison shows that performance (such as the prediction accuracy during the pretraining, the reconstruction MSE in the pretraining, and the mAP) of the proposed solution are better than the existing solutions.

In accordance with some example implementations of the present disclosure, the number of bottleneck tokens effects the finetuning performance. In FIG. 6, there is around 2.0% mAP increase when bottlenecks are applied during finetuning. This demonstrates that spectrograms and waveforms encompass complementary semantic information, and bottlenecks effectively mitigate temporal misalignment during finetuning by restricting information exchange. This indicates that similar to video understanding, temporal alignment is also critical for audio understanding tasks such as classification.

In accordance with some example implementations of the present disclosure, larger batch sizes significantly boost the performances for contrastive learning and SSAST. The original SSAST was trained with a small batch size of just 24, which poses limitations for contrastive learning. Small batch sizes restrict the number of negative samples within the same batch, making the contrastive learning (CL) objective more challenging in distinguishing positive from negative samples. Similar to the previous findings from computer vision, the larger batch size will lead to better performances especially for PSWaCL, because with more negative samples within each batch, the model is able to contrast and capture distinct semantics from both spectrogram and waveform representation more effectively. By increasing the batch size from 24 to 180, CRAFT doubles its performances.

Figure 4:
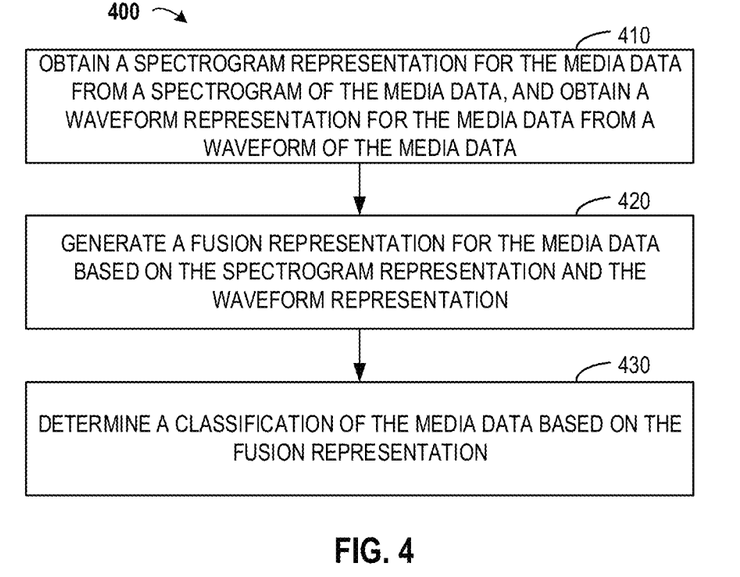
FIG. 4 illustrates a flowchart of a method for processing media data in accordance with some example implementations of the present disclosure.

FIG. 4 illustrates a flowchart of a method 800 for media data processing in accordance with some example implementations of the present disclosure. The method 800 may be implemented at any computing device. At a block 410, a spectrogram representation is obtained for the media data from a spectrogram of the media data, and a waveform representation is obtained for the media data from a waveform of the media data. At a block 420, a fusion representation is generated for the media data based on the spectrogram representation and the waveform representation. At a block 430, a classification of the media data is determined based on the fusion representation.

In implementations of the present disclosure, obtaining the spectrogram representation comprises: generating a spectrogram map from the spectrogram of the media data; obtaining a plurality of spectrogram patches from the spectrogram map; and determining the spectrogram representation based on the plurality of spectrogram patches.

In implementations of the present disclosure, obtaining the waveform representation comprises: generating a waveform map from the waveform of the media data; obtaining a plurality of waveform patches from the waveform map, the plurality of waveform patches being aligned to the plurality of the spectrogram patches; and determining the waveform representation based on the plurality of waveform patches.

In implementations of the present disclosure, generating the fusion representation for the media data based on the spectrogram representation and the waveform representation comprises: determining an intermedia representation based on a bottleneck representation, the spectrogram representation and the waveform representation according to an attention operation, a dimension of the intermedia representation being equal to a sum of dimensions of the bottleneck representation, the spectrogram representation and the waveform representation; and extracting the fusion representation from the intermedia representation by removing a portion of the intermedia representation corresponding to the bottleneck representation.

In implementations of the present disclosure, determining the intermedia representation comprises: determining, based on a concatenation of the spectrogram representation and the bottleneck representation, an intermedia spectrogram representation according to the attention operation; determining, a concatenation of the waveform representation and the bottleneck representation, an intermedia waveform representation according to the attention operation; and generating the intermedia representation based on an attention of the intermedia spectrogram representation and the intermedia waveform representation.

In implementations of the present disclosure, the method is implemented by a learning model obtained by: pretraining the learning model based on unlabeled media data according to self-supervised contrastive learning; and adjusting the pretrained learning model based on labeled media data.

In implementations of the present disclosure, pretraining the learning model comprises: obtaining a first spectrogram representation and a first waveform representation from first media data, the first media data being unlabeled media data; and updating the learning model according to a contrastive loss that decreases a difference between the first spectrogram representation and the first waveform representation.

In implementations of the present disclosure, pretraining the learning model further comprises: obtaining a second spectrogram representation and a second waveform representation from second media data, the second media data being unlabeled media data; and updating the learning model according to a contrastive loss that increases a difference between the first spectrogram representation and the second waveform representation.

In implementations of the present disclosure, pretraining the learning model further comprises: obtaining reconstructed media data from the learning model based on any of the first spectrogram representation and the first waveform representation; and updating the learning model based on a reconstruction loss that decreases a difference between the first media data and the reconstructed media data.

In implementations of the present disclosure, adjusting the pretrained learning model comprises: obtaining an estimated classification from the pretrained learning model based on a third fusion representation of third media data, the third media data being labeled media data; and updating the pretrained learning model based on a classification loss that decreases a difference between a classification of third media data and the estimated classification.

According to implementations of the present disclosure, an electronic device is proposed. The electronic device comprises a computer processor coupled to a computer-readable memory unit, the memory unit comprising instructions that when executed by the computer processor implements a method for processing media data. The method comprises: obtaining a spectrogram representation for the media data from a spectrogram of the media data, and obtaining a waveform representation for the media data from a waveform of the media data; generating a fusion representation for the media data based on the spectrogram representation and the waveform representation; and determining a classification of the media data based on the fusion representation.

In implementations of the present disclosure, obtaining the spectrogram representation comprises: generating a spectrogram map from the spectrogram of the media data; obtaining a plurality of spectrogram patches from the spectrogram map; and determining the spectrogram representation based on the plurality of spectrogram patches.

In implementations of the present disclosure, obtaining the waveform representation comprises: generating a waveform map from the waveform of the media data; obtaining a plurality of waveform patches from the waveform map, the plurality of waveform patches being aligned to the plurality of the spectrogram patches; and determining the waveform representation based on the plurality of waveform patches.

In implementations of the present disclosure, generating the fusion representation for the media data based on the spectrogram representation and the waveform representation comprises: determining an intermedia representation based on a bottleneck representation, the spectrogram representation and the waveform representation according to an attention operation, a dimension of the intermedia representation being equal to a sum of dimensions of the bottleneck representation, the spectrogram representation and the waveform representation; and extracting the fusion representation from the intermedia representation by removing a portion of the intermedia representation corresponding to the bottleneck representation.

In implementations of the present disclosure, determining the intermedia representation comprises: determining, based on a concatenation of the spectrogram representation and the bottleneck representation, an intermedia spectrogram representation according to the attention operation; determining, a concatenation of the waveform representation and the bottleneck representation, an intermedia waveform representation according to the attention operation; and generating the intermedia representation based on an attention of the intermedia spectrogram representation and the intermedia waveform representation.

In implementations of the present disclosure, the method is implemented by a learning model obtained by: pretraining the learning model based on unlabeled media data according to self-supervised contrastive learning; and adjusting the pretrained learning model based on labeled media data.

In implementations of the present disclosure, pretraining the learning model comprises: obtaining a first spectrogram representation and a first waveform representation from first media data, the first media data being unlabeled media data; and updating the learning model according to a contrastive loss that decreases a difference between the first spectrogram representation and the first waveform representation.

In implementations of the present disclosure, pretraining the learning model further comprises: obtaining a second spectrogram representation and a second waveform representation from second media data, the second media data being unlabeled media data; and updating the learning model according to a contrastive loss that increases a difference between the first spectrogram representation and the second waveform representation.

In implementations of the present disclosure, pretraining the learning model further comprises: obtaining reconstructed media data from the learning model based on any of the first spectrogram representation and the first waveform representation; and updating the learning model based on a reconstruction loss that decreases a difference between the first media data and the reconstructed media data.

In implementations of the present disclosure, adjusting the pretrained learning model comprises: obtaining an estimated classification from the pretrained learning model based on a third fusion representation of third media data, the third media data being labeled media data; and updating the pretrained learning model based on a classification loss that decreases a difference between a classification of third media data and the estimated classification.

Figure 5:
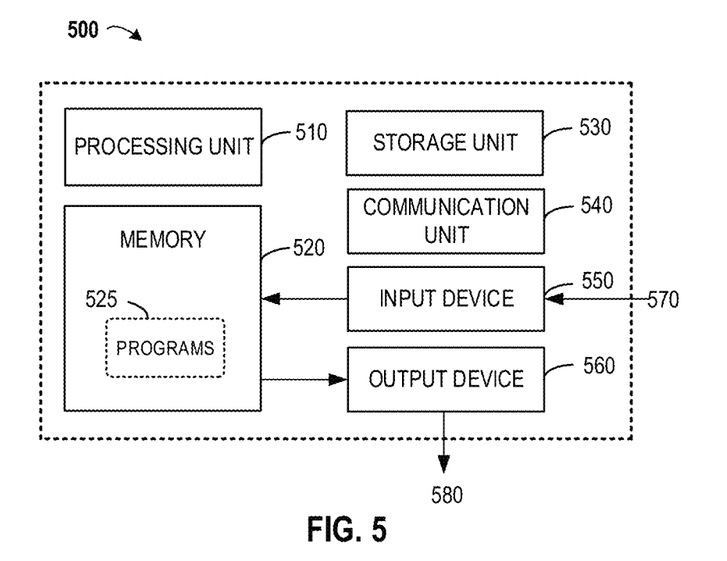
FIG. 5 illustrates a block diagram of a computing device/server in which one or more implementations of the present disclosure may be implemented.

FIG. 9 illustrates a block diagram of a computing device/server 900 in which one or more implementations of the present disclosure may be implemented. It should be understood that the computing device/server 900 shown in FIG. 9 is only an example and should not suggest any limitation on the functionality and scope of the implementations described herein.

As shown in FIG. 9, the computing device/server 900 is in the form of a general computing device. The components of computing device/server 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes based on the programs stored in the memory 920. In a multiprocessor system, multiple processing units execute computer executable instructions in parallel to improve the parallel processing capability of the computing device/server 900.

The computing device/server 900 typically includes multiple computer storage medium. Such medium may be any available medium that is accessible to the computing device/server 900, including but not limited to volatile and non-volatile medium, removable and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 930 may be any removable or non-removable medium, and may include a machine readable medium such as a flash drive, a disk, or any other medium, which may be used to store information and/or data (such as training data for training) and may be accessed within the computing device/server 900.

The computing device/system 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 920 may include a computer program product 925, which has one or more program modules configured to perform various methods or acts of various implementations of the present disclosure.

The communication unit 940 communicates with a further computing device through the communication medium. In addition, functions of components in the computing device/system 900 may be implemented by a single computing cluster or multiple computing machines, which can communicate through a communication connection. Therefore, the computing device/system 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The computing device/system 900 may also communicate with one or more external devices (not shown) through the communication unit 940 as required. The external device, such as a storage device, a display device, etc., communicate with one or more devices that enable users to interact with the computing device/system 900, or communicate with any device (for example, a network card, a modem, etc.) that makes the computing device/system 900 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

What is claimed is:

1. A method for processing media data, comprising:
obtaining a spectrogram representation for the media data from a spectrogram of the media data, and obtaining a waveform representation for the media data from a waveform of the media data;
generating a fusion representation for the media data based on the spectrogram representation and the waveform representation; and
determining a classification of the media data based on the fusion representation,
wherein the method is implemented by a learning model obtained by:
pretraining the learning model based on unlabeled media data according to self-supervised contrastive learning; and
adjusting the pretrained learning model based on labeled media data.

2. The method of claim 1, wherein obtaining the spectrogram representation comprises:
generating a spectrogram map from the spectrogram of the media data;
obtaining a plurality of spectrogram patches from the spectrogram map; and
determining the spectrogram representation based on the plurality of spectrogram patches.

3. The method of claim 2, wherein obtaining the waveform representation comprises:
generating a waveform map from the waveform of the media data;
obtaining a plurality of waveform patches from the waveform map, the plurality of waveform patches being aligned to the plurality of the spectrogram patches; and
determining the waveform representation based on the plurality of waveform patches.

4. The method of claim 1, wherein generating the fusion representation for the media data based on the spectrogram representation and the waveform representation comprises:
determining an intermedia representation based on a bottleneck representation, the spectrogram representation and the waveform representation according to an attention operation, a dimension of the intermedia representation being equal to a sum of dimensions of the bottleneck representation, the spectrogram representation and the waveform representation; and
extracting the fusion representation from the intermedia representation by removing a portion of the intermedia representation corresponding to the bottleneck representation.

5. The method of claim 4, wherein determining the intermedia representation comprises:
determining, based on a concatenation of the spectrogram representation and the bottleneck representation, an intermedia spectrogram representation according to the attention operation;

determining, a concatenation of the waveform representation and the bottleneck representation, an intermedia waveform representation according to the attention operation; and
generating the intermedia representation based on an attention of the intermedia spectrogram representation and the intermedia waveform representation.

6. The method of claim 1, wherein pretraining the learning model comprises:
obtaining a first spectrogram representation and a first waveform representation from first media data, the first media data being unlabeled media data; and
updating the learning model according to a contrastive loss that decreases a difference between the first spectrogram representation and the first waveform representation.

7. The method of claim 6, wherein pretraining the learning model further comprises:
obtaining a second spectrogram representation and a second waveform representation from second media data, the second media data being unlabeled media data; and
updating the learning model according to a contrastive loss that increases a difference between the first spectrogram representation and the second waveform representation.

8. The method of claim 6, wherein pretraining the learning model further comprises:
obtaining reconstructed media data from the learning model based on any of the first spectrogram representation and the first waveform representation; and
updating the learning model based on a reconstruction loss that decreases a difference between the first media data and the reconstructed media data.

9. The method of claim 1, wherein adjusting the pretrained learning model comprises:
obtaining an estimated classification from the pretrained learning model based on a third fusion representation of third media data, the third media data being labeled media data; and
updating the pretrained learning model based on a classification loss that decreases a difference between a classification of third media data and the estimated classification.

10. An electronic device, comprising a computer processor coupled to a computer-readable memory unit, the memory unit comprising instructions that when executed by the computer processor implements a method for processing media data, the method comprising:
obtaining a spectrogram representation for the media data from a spectrogram of the media data, and obtaining a waveform representation for the media data from a waveform of the media data;
generating a fusion representation for the media data based on the spectrogram representation and the waveform representation; and
determining a classification of the media data based on the fusion representation,
wherein the method is implemented by a learning model obtained by:
pretraining the learning model based on unlabeled media data according to self-supervised contrastive learning; and
adjusting the pretrained learning model based on labeled media data.

11. The device of claim 10, wherein obtaining the spectrogram representation comprises:
generating a spectrogram map from the spectrogram of the media data;
obtaining a plurality of spectrogram patches from the spectrogram map; and
determining the spectrogram representation based on the plurality of spectrogram patches.

12. The device of claim 11, wherein obtaining the waveform representation comprises:
generating a waveform map from the waveform of the media data;
obtaining a plurality of waveform patches from the waveform map, the plurality of waveform patches being aligned to the plurality of the spectrogram patches; and
determining the waveform representation based on the plurality of waveform patches.

13. The device of claim 10, wherein generating the fusion representation for the media data based on the spectrogram representation and the waveform representation comprises:
determining an intermedia representation based on a bottleneck representation, the spectrogram representation and the waveform representation according to an attention operation, a dimension of the intermedia representation being equal to a sum of dimensions of the bottleneck representation, the spectrogram representation and the waveform representation; and
extracting the fusion representation from the intermedia representation by removing a portion of the intermedia representation corresponding to the bottleneck representation.

14. The device of claim 13, wherein determining the intermedia representation comprises:
determining, based on a concatenation of the spectrogram representation and the bottleneck representation, an intermedia spectrogram representation according to the attention operation;
determining, a concatenation of the waveform representation and the bottleneck representation, an intermedia waveform representation according to the attention operation; and
generating the intermedia representation based on an attention of the intermedia spectrogram representation and the intermedia waveform representation.

15. The device of claim 10, wherein pretraining the learning model comprises:
obtaining a first spectrogram representation and a first waveform representation from first media data, the first media data being unlabeled media data; and
updating the learning model according to a contrastive loss that decreases a difference between the first spectrogram representation and the first waveform representation.

16. The device of claim 15, wherein pretraining the learning model further comprises:
obtaining a second spectrogram representation and a second waveform representation from second media data, the second media data being unlabeled media data; and
updating the learning model according to a contrastive loss that increases a difference between the first spectrogram representation and the second waveform representation.

17. The device of claim 15, wherein pretraining the learning model further comprises:
obtaining reconstructed media data from the learning model based on any of the first spectrogram representation and the first waveform representation; and
updating the learning model based on a reconstruction loss that decreases a difference between the first media data and the reconstructed media data.

18. A non-transitory computer program product, the non-transitory computer program product comprising a computer readable storage medium having program instructions embodied therewith, the program instructions executable by an electronic device to cause the electronic device to perform a method for processing media data, the method comprising:
obtaining a spectrogram representation for the media data from a spectrogram of the media data, and obtaining a waveform representation for the media data from a waveform of the media data;
generating a fusion representation for the media data based on the spectrogram representation and the waveform representation; and
determining a classification of the media data based on the fusion representation,
wherein the method is implemented by a learning model obtained by:
pretraining the learning model based on unlabeled media data according to self-supervised contrastive learning; and
adjusting the pretrained learning model based on labeled media data.

* * * * *